US011117276B2

(12) United States Patent
Robinson et al.

(10) Patent No.: US 11,117,276 B2
(45) Date of Patent: *Sep. 14, 2021

(54) METHOD FOR GENERATING USER FEEDBACK INFORMATION FROM A SHAVE EVENT

(71) Applicant: The Gillette Company LLC, Boston, MA (US)

(72) Inventors: Susan Clare Robinson, Windsor (GB); Balasundram Periasamy Amavasai, Reading (GB); Matthew Lloyd Barker, Cincinnati, OH (US); Taoran Dong, Cincinnati, OH (US); Ian Anthony Good, Reading (GB); Robert Hinkle, Cincinnati, OH (US); Faiz Feisal Sherman, Cincinnati, OH (US)

(73) Assignee: The Gillette Company LLC, Boston, MA (US)

( * ) Notice: Subject to any disclaimer, the term of this patent is extended or adjusted under 35 U.S.C. 154(b) by 362 days.

This patent is subject to a terminal disclaimer.

(21) Appl. No.: 16/245,596

(22) Filed: Jan. 11, 2019

(65) Prior Publication Data
US 2019/0224863 A1    Jul. 25, 2019

Related U.S. Application Data

(63) Continuation-in-part of application No. 15/875,170, filed on Jan. 19, 2018.

(51) Int. Cl.
*B26B 21/00* (2006.01)
*B26B 19/38* (2006.01)
(Continued)

(52) U.S. Cl.
CPC ........ *B26B 19/388* (2013.01); *B26B 19/3853* (2013.01); *B26B 21/4056* (2013.01);
(Continued)

(58) Field of Classification Search
CPC . B26B 21/4056; B26B 19/388; B26B 21/227; B26B 21/4081; B26B 21/4087; B26B 21/526
(Continued)

(56) References Cited

U.S. PATENT DOCUMENTS 6,189,215 B1    2/2001    Beerwerth et al.
8,615,886 B1    12/2013    Childers
(Continued)

FOREIGN PATENT DOCUMENTS

EP    2540189 A1    1/2013
EP    3141151 A1    3/2017
(Continued)

OTHER PUBLICATIONS

All Office Actions, U.S. Appl. No. 15/875,200.
(Continued)

*Primary Examiner* — Robert P Bullington
(74) *Attorney, Agent, or Firm* — Kevin C. Johnson (57) ABSTRACT

A method for generating user feedback information from a shave event associated with a user. A shaving razor is provided to user. The shaving razor includes a handle, a hair cutting implement connected to the handle, at least one motion sensor in the handle, a hair cutting implement displacement sensor associated with the handle, a communication device associated with the handle and a power source associated with the handle. The power source powers the at least one motion sensor, the hair cutting implement displacement sensor and the communication device. Shave event data associated with the user during a shave is collected from the at least one motion sensor and the hair cutting implement displacement sensor. The shave event data is processed to generate user feedback information.

17 Claims, 5 Drawing Sheets

(51) Int. Cl.
G06F 9/54 (2006.01)
G06F 3/01 (2006.01)
B26B 21/40 (2006.01)
G06F 3/0346 (2013.01)

(52) U.S. Cl.
CPC .......... B26B 21/4087 (2013.01); G06F 3/011 (2013.01); G06F 3/016 (2013.01); G06F 3/017 (2013.01); G06F 3/0346 (2013.01); G06F 9/542 (2013.01)

(58) Field of Classification Search
USPC ........................................................ 434/247
See application file for complete search history.

(56) References Cited

U.S. PATENT DOCUMENTS

| | | | |
|---|---|---|---|
| 9,126,346 | B2 | 9/2015 | Meier et al. |
| 9,174,351 | B2 | 11/2015 | Binder |
| 10,647,011 | B2 | 5/2020 | Robinson et al. |
| 10,960,560 | B2 | 3/2021 | Robinson et al. |
| 2002/0088121 | A1 | 7/2002 | Jacobsen |
| 2002/0189102 | A1 | 12/2002 | Orloff |
| 2008/0168657 | A1 | 7/2008 | Cloke et al. |
| 2008/0189953 | A1 | 8/2008 | Jessemey et al. |
| 2009/0056141 | A1 | 3/2009 | Barry et al. |
| 2011/0010875 | A1 | 1/2011 | Iwahori et al. |
| 2011/0018985 | A1 | 1/2011 | Zhu |
| 2012/0167392 | A1 | 7/2012 | Cherian et al. |
| 2014/0137883 | A1 | 5/2014 | Rothschild |
| 2015/0183118 | A1 | 7/2015 | Roth |
| 2015/0205279 | A1 | 7/2015 | Simeth |
| 2016/0046028 | A1 | 2/2016 | Meier et al. |
| 2016/0143718 | A1 | 5/2016 | Serval |
| 2016/0167241 | A1* | 6/2016 | Goldfarb ................ B26B 21/28 382/108 |
| 2016/0262521 | A1 | 9/2016 | Kustra et al. |
| 2016/0263755 | A1 | 9/2016 | Uit De Bulten et al. |
| 2017/0079421 | A1 | 3/2017 | Tamminga et al. |
| 2017/0097758 | A1 | 4/2017 | Bauer et al. |
| 2017/0232624 | A1* | 8/2017 | King ........................ G01K 1/14 30/34.05 |
| 2017/0303673 | A1 | 10/2017 | Van Gool et al. |
| 2017/0305023 | A9 | 10/2017 | Ball et al. |
| 2017/0325566 | A1* | 11/2017 | Franklin ................ B26B 19/388 |
| 2018/0132603 | A1 | 5/2018 | Gatzemeyer et al. |
| 2018/0160796 | A1 | 6/2018 | Jeanne et al. |
| 2018/0236675 | A1 | 8/2018 | Westerhof et al. |
| 2019/0191850 | A1 | 6/2019 | Yoganandan et al. |
| 2019/0200746 | A1 | 7/2019 | Serval et al. |
| 2019/0224864 | A1 | 7/2019 | Robinson et al. |
| 2019/0224867 | A1 | 7/2019 | Robinson et al. |
| 2019/0224869 | A1 | 7/2019 | Robinson et al. |
| 2019/0251860 | A1 | 8/2019 | Lawrenson et al. |
| 2020/0139565 | A1 | 5/2020 | Panagiotopoulou et al. |
| 2020/0316799 | A1 | 10/2020 | Tsegenidis et al. |

FOREIGN PATENT DOCUMENTS

| | | |
|---|---|---|
| WO | 20090176415 A2 | 6/2009 |
| WO | WO2013061214 A1 | 5/2013 |
| WO | 2015068068 A1 | 5/2015 |

OTHER PUBLICATIONS

All Office Actions, U.S. Appl. No. 15/875,557.
All Office Actions, U.S. Appl. No. 15/875,170.
All Office Actions, U.S. Appl. No. 15/875,531.
All Office Actions, U.S. Appl. No. 16/245,730.
Extended European Search Report and Search Opinion; Application No. 19151395.1 dated Mar. 22, 2019; 7 pages.

* cited by examiner

107 — A QUANTITY OF SHAVING STROKES TAKEN, A TYPE OF SHAVING STROKE TAKEN, A DIRECTION A SHAVING STROKE WAS TAKEN, A LENGTH OF A SHAVING STROKE, A LOCATION ON A USER'S BODY WHERE A SHAVE STROKE IS TAKEN, A PRESSURE/LOAD EXERTED DURING A SHAVE STROKE, A SPEED OF A SHAVE STROKE, A TEMPERATURE OF THE WATER USED DURING THE SHAVE, A TIME OF DAY WHEN THE SHAVE IS TAKEN, A TOTAL AMOUNT OF TIME TAKEN FOR THE SHAVE, A TOTAL CONTACT TIME BETWEEN THE RAZOR CARTRIDGE AND THE USER, A FREQUENCY THAT THE USER SHAVES, A SEQUENCE IN WHICH SHAVING STROKES ARE TAKEN, A SHAVE STROKE MAP, A COUNT OF UPWARD STROKES TAKEN, A COUNT OF DOWNWARD STROKES TAKEN, A COUNT OF THE STROKES TAKEN WITH THE HAIR GRAIN, A COUNT OF THE STROKES TAKEN AGAINST THE HAIR GRAIN, A COUNT OF THE NUMBER OF HAIR CUTTING IMPLEMENT RINSES, AN EJECTION OF THE HAIR CUTTING IMPLEMENT, A USAGE STATUS OF THE HAIR CUTTING IMPLEMENT, AND AN ATTACHMENT OF A NEW HAIR CUTTING IMPLEMENT TO THE HANDLE

FIG. 4

108 — A MAINTENANCE OF A USER'S BEHAVIOR, A MAINTENANCE OF A USER'S SHAVE HABIT, A CHANGE IN A USER'S SHAVE HABIT, A CHANGE IN THE PRODUCT TO USE PRIOR TO SHAVING, A CHANGE IN THE PRODUCT TO USE AFTER SHAVING, A CHANGE IN THE PRODUCT TO USE DURING SHAVING, A CHANGE IN THE DIRECTION A SHAVING STROKE IS TAKEN, A CHANGE IN THE LENGTH OF A SHAVING STROKE, A CHANGE IN THE NUMBER OF SHAVING STROKES TAKEN, A CHANGE IN THE PRESSURE/LOAD APPLIED DURING A SHAVE STROKE, A CHANGE IN THE SPEED OF A SHAVE STROKE TAKEN, A CHANGE IN THE LOCATION WHERE THE USER SHAVES, A CHANGE IN THE AMOUNT OF TIME TAKEN TO PREPARE THE SKIN AND HAIR FOR SHAVING, A CHANGE IN THE TEMPERATURE OF THE WATER USED DURING SHAVING, A CHANGE IN THE TEMPERATURE OF THE WATER USED TO PREPARE THE USER'S SKIN FOR SHAVING, A CHANGE IN THE TIME OF DAY WHEN THE USER SHAVES, A CHANGE IN THE FREQUENCY IN WHICH THE USER SHAVES, A CHANGE IN THE TYPE OF RAZOR CARTRIDGE BEING USED DURING THE SHAVE, A CHANGE TO A NEW RAZOR CARTRIDGE, A CHANGE IN THE PRODUCT USED ON THE SKIN BETWEEN SHAVES, A CHANGE IN THE ORDER OF LOCATION ON THE BODY IN WHICH STROKES ARE TAKEN, AND A CHANGE IN THE AREA OF THE USER'S BODY TO BE SHAVED

METHOD FOR GENERATING USER FEEDBACK INFORMATION FROM A SHAVE EVENT

FIELD OF THE INVENTION

The present invention relates to the field of Internet of Things (IoT) and connected personal appliances and more particularly to a method for generating user feedback information from a shave event associated with a user.

BACKGROUND OF THE INVENTION

There are numerous personal appliances used by consumers every day. Examples of such personal appliances include but are not limited to shaving razors, electric shavers, epilators, body scrubbers, toothbrushes and hair brushes. Proper usage techniques of such personal appliances facilitate the overall efficacy of the product providing the user with a more positive experience than he or she would have otherwise experienced. Such positive usage experiences will likely lead to continued product usage. Providing the user with information about proper usage techniques for using personal appliance has been limited.

Razors with sensors have been used to provide information to the user. Razors with proximity sensors or cameras have been used to provide information on blade attrition. Razors with force sensors have been used to provide the user with information on the amount of force being applied to the skin. By tracking the force being applied during the shave provides a metric to gauge blade dulling and predict blade attrition. Razors having sensors to count shaving strokes have been used to again assist with gauging blade attrition. Cameras have been used to provide users with boundary indicators such as distinguishing between areas of long hair such as side burns adjacent to areas of shorter hair length.

While these existing sensors do assist in providing the user with some basic information they fall well short of providing the usage information needed for an improved shave. To provide the user with the necessary usage information for an improved shave, the razor or personal appliance needs to have sensors that provide the user with useful information and/or data about the user's shave. With the useful information and/or data about user's shave the user can see how he or she is shaving and can discover ways to improve the shave.

SUMMARY OF THE INVENTION

The present invention relates to a method for generating user feedback information from a shave event associated with a user. A shaving razor is provided to a user. The shaving razor comprises a handle comprising a connecting structure; a hair cutting implement comprising of at least one blade, the hair cutting implement being connected to the connecting structure; at least one motion sensor associated with the handle; a hair cutting implement displacement sensor associated with the handle, the hair cutting implement displacement sensor measuring a displacement of the hair cutting implement relative to a fixed position of the handle; a communication device associated with the handle; and a power source associated with the handle. The at least one motion sensor, the hair cutting implement displacement sensor and the communication device are powered via the power source. Shave event data associated with the user during a shave is collected from at least one motion sensor and the hair cutting implement displacement sensor. The shave event data is processed to generate user feedback information.

The user feedback information may comprise at least one of the following, a quantity of shaving strokes taken, a type of shaving stroke taken, a direction a shaving stroke was taken, a length of a shaving stroke, a location on a user's body where a shave stroke is taken, a pressure/load exerted during a shave stroke, a speed of a shave stroke, a temperature of the water used during the shave, a time of day when the shave is taken, a total amount of time taken for the shave, a total contact time between the hair cutting implement and the user, a frequency that the user shaves, a sequence in which shaving strokes are taken, a shave stroke map, a count of upward strokes taken, a count of downward strokes taken, a count of the strokes taken with the hair grain, a count of the strokes taken against the hair grain, a count of the number of hair cutting implement rinses, an ejection of the hair cutting implement, a usage status of the hair cutting implement, and an attachment of a new hair cutting implement to the handle.

The method may further comprise the step of communicating the user feedback information to the user. The user feedback information may be communicated to the user during the shave event or after the shave event. The user feedback information may be communicated to a computing device. The computing device may comprise a mobile device, a tablet, a handheld device and/or a desktop device. The desktop device may take the form of a base for holding the shaving razor. The base may include an LED display or any communication device allowing for communication with the user. The base may also be used to re-charge the shaving razor.

The method may further comprise the step of recommending a behavior to the user. The recommendation may be communicated to a computing device. The computing device may comprise a mobile device, a tablet, a handheld device and/or a desktop device. The desktop device may take the form of a base for holding the shaving razor. The recommended behavior may comprise a maintenance of a user's behavior, a maintenance of a user's shave habit, a change in a user's shave habit, a change in the product to use prior to shaving, a change in the product to use after shaving, a change in the product to use during shaving, a change in the direction a shaving stroke is taken, a change in the length of a shaving stroke, a change in the number of shaving strokes taken, a change in the pressure/load applied during a shave stroke, a change in the speed of a shave stroke taken, a change in the location where the user shaves, a change in the amount of time taken to prepare the skin and hair for shaving, a change in the temperature of the water used during shaving, a change in the temperature of the water used to prepare the user's skin for shaving, a change in the time of day when the user shaves, a change in the frequency in which the user shaves, a change in the type of hair cutting implement being used during the shave, a change to a new hair cutting implement, a change in the product used on the skin between shaves, a change in the order of location on the body in which strokes are taken, and a change in the area of the user's body to be shaved.

The at least one motion sensor may comprise an acceleration sensor, an angular velocity sensor, and/or a magnetic field sensor.

The hair cutting implement displacement sensor may comprise a switch, a magnetometer, a Hall Effect sensor, a capacitive sensor, an optical sensor, a load sensor, and/or a displacement sensor.

The shaving razor may further comprise a barometric pressure sensor associated with the handle.

The shaving razor may further comprise at least one temperature sensor associated with the handle. The at least one temperature sensor may comprise a thermistor.

The power source may comprise a rechargeable battery, a disposable battery or a corded electrical connection.

The shaving razor may comprise one or more sensors associated with the hair cutting implement. The one or more sensors associated with the hair cutting implement may comprise a switch, an acceleration sensor, a magnetic field sensor, an angular velocity sensor, a velocity sensor, a distance sensor, a proximity sensor, a displacement sensor, a capacitive sensor, an electrical conductance sensor, an electrical resistance sensor, an electrical current sensor, a load sensor, a strain sensor, a friction sensor, a fluid flow sensor, pressure sensor, an atmospheric pressure sensor, a temperature sensor, an optical sensor, an infrared sensor, an acoustic sensor, a vibration sensor, a humidity sensor, a chemical sensor, a particle detector, a bio sensor, an RFID sensor, a NFC sensor, and/or a wireless receiver.

The method may further comprise a sensor for detecting the presence of the hair cutting implement on the handle.

BRIEF DESCRIPTION OF THE DRAWINGS

While the specification concludes with claims particularly pointing out and distinctly claiming the subject matter which is regarded as forming the present invention, it is believed that the invention will be better understood from the following description which is taken in conjunction with the accompanying drawings in which like designations are used to designate substantially identical elements, and in which:

FIG. 4 is a plan diagram of the user feedback information.

FIG. 5 is a plan diagram of the recommended behaviors.

DETAILED DESCRIPTION OF THE INVENTION

Figure 1:
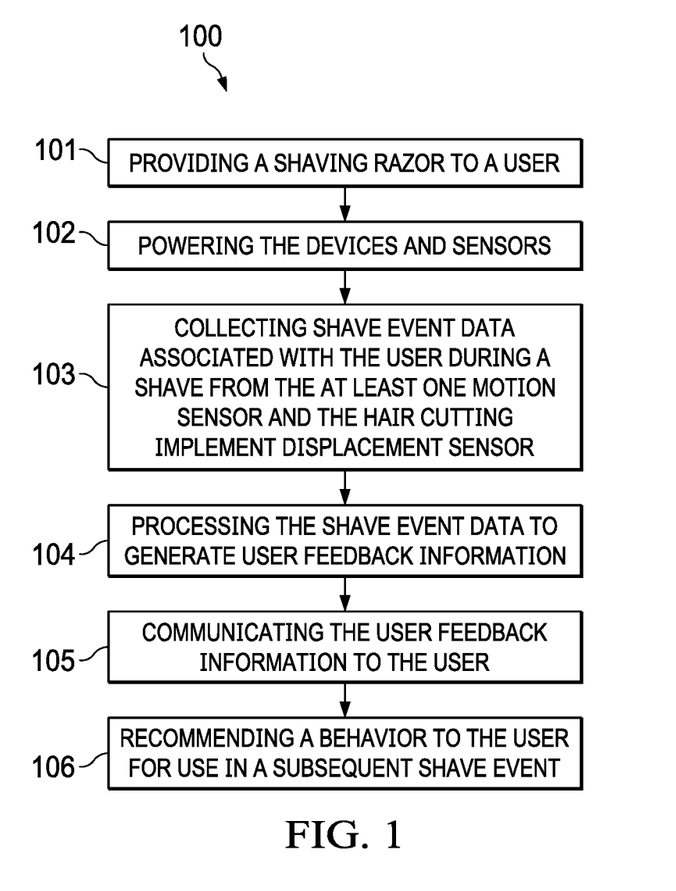
FIG. 1 is a plan diagram of the method of the present invention.
Figure 2:
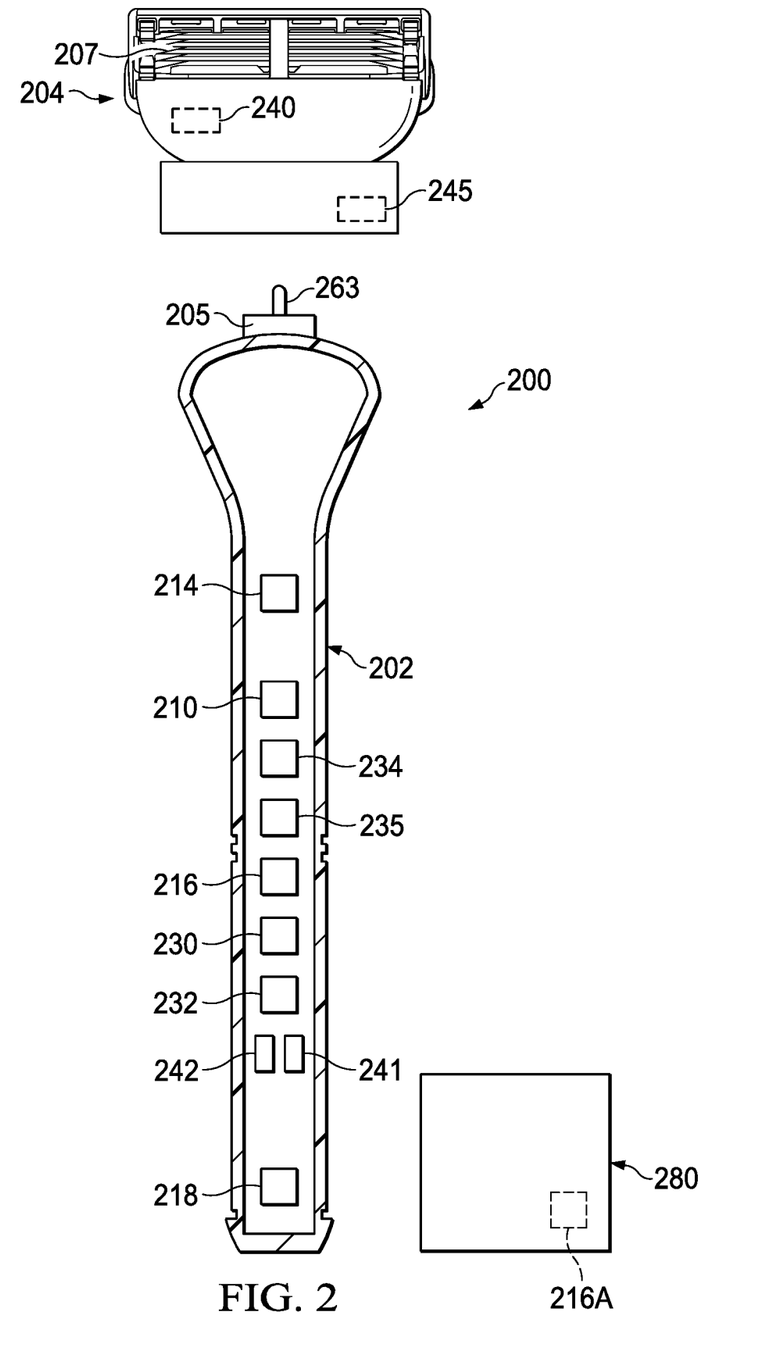
FIG. 2 is an exploded partial cut away view of a shaving razor.
Figure 3:
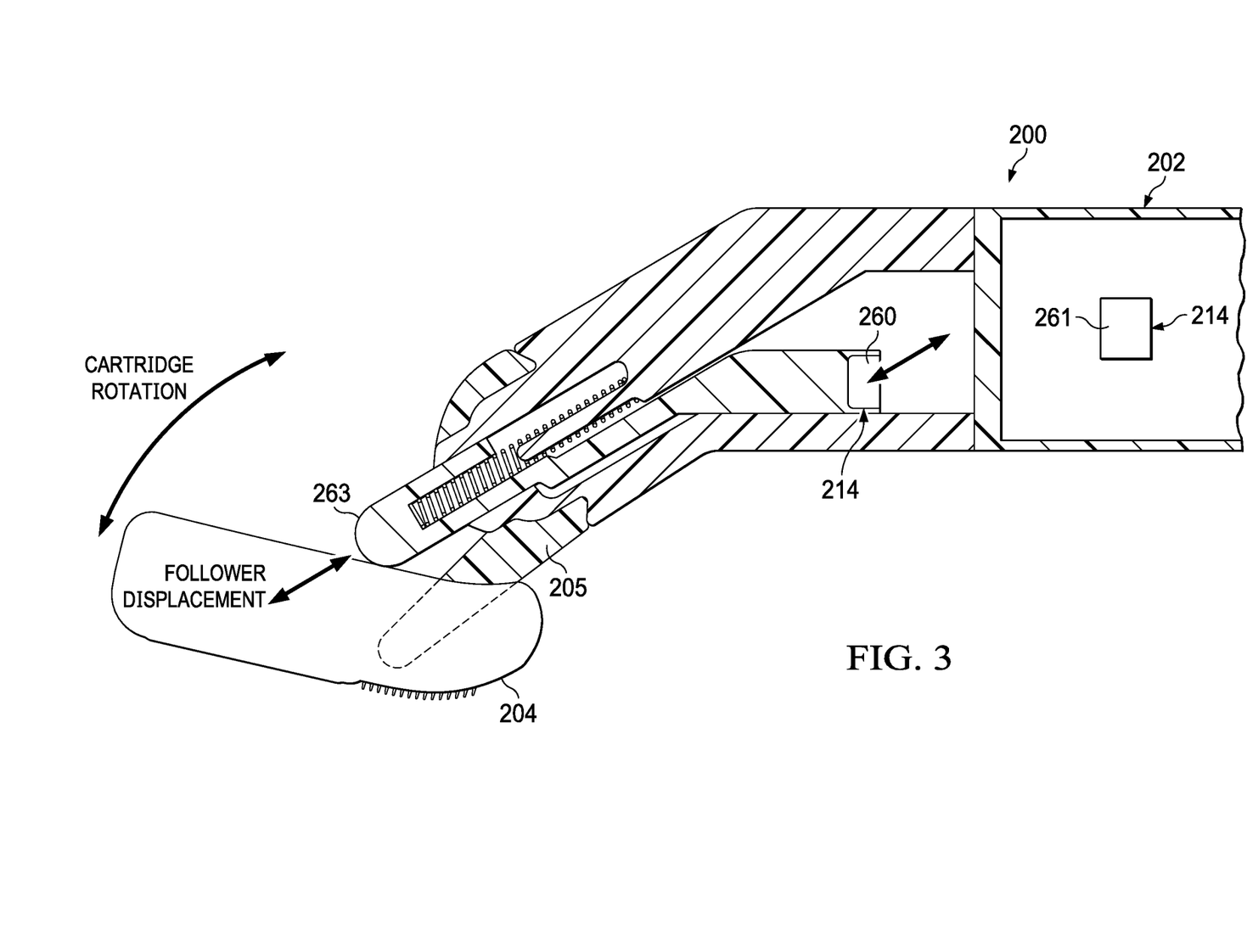
FIG. 3 is a cut away view of a shaving razor showing the displacement sensor.

Referring now to FIG. 1 there is shown a plan diagram 100 of a method for generating user feedback information from a shave event associated with a user of the present invention. A shaving razor is provided to a user at 101. Referring now to FIGS. 2 and 3, the shaving razor 200 comprises a handle 202. The handle 202 comprises a connecting structure 205. A hair cutting implement 204 is connected to the connecting structure 205. The hair cutting implement 204 includes at least one blade 207 for cutting hair. Any number of blades 207 may be used for a hair cutting implement design. The hair cutting implement may comprise a wet shaving cartridge or a dry shaving head.

At least one motion sensor 210 is associated with the handle. The at least one motion sensor 210 is positioned in the handle. Suitable motion sensors include but are not limited to an acceleration sensor such as an accelerometer, an angular velocity sensor such as a gyroscope, and a magnetic field sensor.

A hair cutting implement displacement sensor 214 is associated with the handle. The hair cutting implement displacement sensor 214 is positioned in the handle. The hair cutting implement displacement sensor 214 measures a displacement of the hair cutting implement 204 relative to a fixed position of the handle 202. The hair cutting implement displacement sensor 214 may take on many forms. Suitable hair cutting implement displacement sensors 214 comprise a magnetometer, an optical sensor, a switch, a Hall Effect sensor, a capacitive sensor, a load sensor and a displacement sensor. The hair cutting implement displacement sensor 214 is useful to detect and measure contact of the implement with a user's body. During use of shaving razor 200 the hair cutting implement displacement sensor 214 located in handle 202 detects and measures contact of hair cutting implement 204 with a user's body. Such contact measurement is an indication that the shaving razor 200 is in use as the hair cutting implement 204 is in contact with the user's body.

The hair cutting implement displacement sensor 214 comprises a magnet 260 embedded in follower 263 and a magnetometer 261 contained within handle 202. As the user shaves, hair cutting implement 204 rotates or pivots as it contacts the users skin. As the hair cutting implement 204 rotates it pushes on follower 263 causing follower 263 to move inward into handle 202. As follower 263 moves inward into handle 202, magnet 260 moves closer to magnetometer 261. Follower 263 converts the rotational movement of the hair cutting implement 204 into a displacement of the magnet 260 relative to handle 202. The amount of displacement of follower 263 directly correlates to the rotational displacement of hair cutting implement 204 relative to a fixed position on handle 202. The implement displacement sensor 214 measures the change in magnetic field associated with the movement of magnet 260 relative to magnetometer 261.

While the hair cutting implement displacement sensor 214 measures a linear displacement of magnet 260 relative to a fixed position on handle 202, hair cutting implement displacement sensor 214 can also be used to determine a rotational displacement of hair cutting implement 204 relative to a fixed position on handle 202.

A communication device 216 is associated with the handle 202. The communication device 216 is positioned in the handle. The communication device 216 may take on many forms. Suitable communication devices 216 comprise an LED display, an LCD display, a wired connection, a memory card which may be removable, a vibration device, a microphone, an audio device and/or a wireless connection such as, a Wi-Fi connection, a SIM card with GSM connection, a Bluetooth transmitter, a Li-Fi connection, and an infra-red transmitter. The communication device 216 allows the shaving razor 200 to communicate with a user and/or a second device 280. The user can select the desired type or intensity of the communication. For example, the user can select the color, the level of vibration, or the volume of sound. The communication with a second device 280 may be wirelessly through a cloud architecture and wirelessly to the second device. The communication may be directly to the second device. The second device 280 may be a mobile phone, a computer application, a computer or an electronic device. The second device 280 has a communication device 216A for communicating with communication device 216. The communication device 216A may be the same or different than the communication device 216. Communication device 216A may also communicate directly with the user. The communication device 216 may be mounted in the handle such that it is visible to the user. For example, the communication device may comprise an LED display mounted in the handle that is visible to the user providing direct communication to the user.

A power source 218 is associated with the handle 202. The power source 218 is positioned in the handle. The power source 218 may take on many forms. Suitable power sources 218 comprise a rechargeable battery, a disposable battery and a corded electrical connection. The power source 218 powers the various sensors and devices located in the handle 202 requiring power to operate. The power source may power the at least one motion sensor 210, the hair cutting implement displacement sensor 214 and/or the communication device 216.

Referring again to FIG. 1, the devices and sensors are powered at 102. The devices and sensors include the at least one motion sensor 210, the hair cutting implement displacement sensor 214 and the communication device 216 all of which are powered via the power source 218.

At 103 shave event data associated with the user during a shave is collected. The shave event data includes data from the at least one motion sensor 210 and the hair cutting implement displacement sensor 214.

At 104 the shave event data is processed to generate user feedback information. Referring now to FIG. 4. details of the user feedback are provided at 107. The user feedback information 107 comprises at least one of the following, a quantity of shaving strokes taken, a type of shaving stroke taken, a direction a shaving stroke was taken, a length of a shaving stroke, a location on a user's body where a shave stroke is taken, a pressure/load exerted during a shave stroke, a speed of a shave stroke, a temperature of the water used during the shave, a time of day when the shave is taken, a total amount of time taken for the shave, a total contact time between the hair cutting implement and the user, a frequency that the user shaves, a sequence in which shaving strokes are taken, a shave stroke map, a count of upward strokes taken, a count of downward strokes taken, a count of the strokes taken with the hair grain, a count of the strokes taken against the hair grain, a count of the number of hair cutting implement rinses, an ejection of the hair cutting implement, a usage status of the hair cutting implement, and an attachment of a new hair cutting implement to the handle.

The method may further comprise the step of communicating the user feedback information to the user at 105. The user feedback information may be communicated to the user during the shave event or after the shave event. The user feedback information may be communicated to a second device 280 as shown in FIG. 2. The second device 280 may comprise a computing device. The computing device may comprise a mobile device, a tablet, a handheld device and/or a desktop device. The desktop device may take the form of a base for holding the shaving razor.

The method may further comprise the step of recommending a behavior to the user at 106. The behavior recommendation may be communicated to a second device 280 as shown in FIG. 2. The second device 20 may comprise a computing device. The computing device may comprise a mobile device, a tablet, a handheld device and/or a desktop device. The desktop device may take the form of a base for holding the shaving razor. The base may also be a recharging station for the shaving razor.

Referring now to FIG. 5 the recommended behavior is shown in detail at 108. The recommended behavior 108 comprises a maintenance of a user's behavior, a maintenance of a user's shave habit, a change in a user's shave habit, a change in the product to use prior to shaving, a change in the product to use after shaving, a change in the product to use during shaving, a change in the direction a shaving stroke is taken, a change in the length of a shaving stroke, a change in the number of shaving strokes taken, a change in the pressure applied during a shave stroke, a change in the speed of a shave stroke taken, a change in the location where the user shaves, a change in the amount of time taken to prepare the skin and hair for shaving, a change in the temperature of the water used during shaving, a change in the temperature of the water used to prepare the user's skin for shaving, a change in the time of day when the user shaves, a change in the frequency in which the user shaves, a change in the type of hair cutting implement being used during the shave, a change to a new hair cutting implement, a change in the product used on the skin between shaves, a change in the order of location on the body in which strokes are taken, and a change in the area of the user's body to be shaved.

The handle 202 may further comprise a barometric pressure sensor 230 associated with the handle. The barometric pressure sensor 230 is positioned in the handle. The handle 202 may further comprise at least one temperature sensor 232 associated with the handle. The temperature sensor 232 is positioned in the handle. The at least one temperature sensor 232 may comprise a thermistor.

The shaving razor 200 may comprise one or more sensors 240 associated with the hair cutting implement 204. The one or more sensors 240 associated with the hair cutting implement 204 may comprise a switch, an acceleration sensor, a magnetic field sensor, an angular velocity sensor, a velocity sensor, a distance sensor, a proximity sensor, a displacement sensor, a capacitive sensor, an electrical conductance sensor, an electrical resistance sensor, an electrical current sensor, a load sensor, a strain sensor, a friction sensor, a fluid flow sensor, pressure sensor, an atmospheric pressure sensor, a temperature sensor, an optical sensor, an infrared sensor, an acoustic sensor, a vibration sensor, a humidity sensor, a chemical sensor, a particle detector, a bio sensor, an RFID sensor, a NFC sensor and/or a wireless receiver.

The method may further comprise a sensor 245 for detecting the presence of the hair cutting implement 204 on the handle 202.

With the power source 218 on, raw data is collected 103 during the shave event associated with a user from the at least one motion sensor 210 and the hair cutting implement displacement sensor 214. The raw data is then processed where it is converted into measurements. The measurements may be made by a logic device such as a microprocessor. The microprocessor may be located within the handle. Alternatively, the raw data can be sent from communication device 216 to an external device such as a mobile phone, a computer application, a computer or electronic device, such as a base station for holding the shaving razor. The shave event, including the presence of a hair cutting implement on the handle, is detected from the raw data of the at least one motion sensor 210 and hair cutting implement displacement sensor 214 using an algorithm. The algorithm may comprise of monitoring the displacement of the hair cutting implement via the hair cutting displacement sensor 214 while the razor is in a static condition to detect the presence of hair cutting implement 204 connected to the handle 202 via the implement connecting structure 205. The hair cutting implement displacement sensor 214 will reset from a baseline position where no hair cutting implement 204 is attached and the follower 263 is in a fully extended position to a first position where the displacement is in a new at rest position different from the baseline position as the follower is no longer in a fully extended position with the hair cutting implement attached as the follower makes contact with the hair cutting implement. The same logic can be used to determine if hair cutting implement 204 has been ejected by looking for a signal on hair cutting implement displacement sensor 214. The algorithm may comprise of monitoring activity as recorded by hair cutting implement displacement sensor 214 or at least one motion sensor 210. For example, if a user starts shaving there would be activation of the hair cutting implement displacement sensor 214 when shaving razor 200 touches the skin on the user's face. With activation of the at least one motion sensor 210 and no activation of the hair cutting implement displacement sensor 214 the event would be rejected as a shave. Also, it can be understood that time between signals and events can be used to determine actions like re-application of shave cream.

In use, the user will grasp handle 202 of shaving razor 200. The power source 218 will power up and power the sensors and devices needing power. The power source 218 may power up automatically upon contact with or movement by user. Alternatively, the power source 218 may power up via an on/off switch. Alternatively, the power source 218 may be constantly on and preferably in a power save mode while not in use and then in full power mode when in use. The user will then shave with shaving razor 200.

As the user shaves, data is collected from the at least one motion sensor 210 and the hair cutting implement displacement sensor 214. The data collected can be used to calculate the pitch and roll of the handle 202 as well as contact data. The data collected may also be used to calculate pressure/load exerted on the hair cutting implement 204, speed of movement of hair cutting implement 204, the number and length of each shaving stroke experienced by hair cutting implement 204, and the total distance or mileage the hair cutting implement 204 has experienced at any given point in time. The collected data may also include the identity of the user or user group. For example, if the handle is being used by more than one user, the data will provide a finger print that indicates that a different user is using the product. Additionally, users can be clustered into different "types" of users based on data from the handle. When the user is finished shaving the shaving razor 200 is put down and data collection stops. The collected data may be transmitted instantaneously as the data is collected via the communication device 216 to a computing device. The computing device may be located in the handle or may be located in a second device such as a mobile device, a tablet, a handheld device or a desktop device such as a base station. Alternatively, the collected data is transmitted after the data from a single shaving event or multiple shaving events has been collected via the communication device 216. The data, whether transmitted instantaneously or after a period of time, can be transmitted through the communication device 216. The communication may be in the form of a color coming from an LED positioned on the handle or base station, such as the color green, indicating that the load being exerted on the hair cutting implement 204 is an acceptable level, the color yellow indicating that the pressure/load being exerted on the hair cutting implement 204 is getting near a maximum pressure/load that is to be exerted on hair cutting implement 204 and the color red indicating that the pressure/load being exerted on the hair cutting implement 204 is exceeding the maximum pressure/load that is to be exerted on hair cutting implement 204.

A rinse of the hair cutting implement 204 can be detected from the raw data of the at least one motion sensor 210 and hair cutting implement displacement sensor 214 using an algorithm. A simple algorithm such as a decision tree (or ensemble of trees), logistic regression, or a recurrent neural network (RNN) can be trained by supervised learning to predict rinse versus no rinse using one or more of the sensor inputs. In some cases, like in RNN, raw sensor signals can be fed in to train the model. In other cases, like decision trees features like mean, standard deviations, etc. can be calculated to feed into the trained model for prediction.

A shave stroke can be detected from the raw data of the hair cutting implement displacement sensor 214 and the at least one motion sensor 210 using an algorithm. An algorithm looking at activation of hair cutting implement displacement sensor 214 in combination with a certain activity level of the at least one motion sensor 210 to indicate expected motion that represents a shave stroke.

A summary of the shave can be generated from the collected and processed data and can also be fused with other information directly from the consumer to add an extra level of context such as which strokes were made in the direction of the hair grain.

Additional sensors and devices may be used such as an orientation sensor 234, and a clock 235. The shaving razor may also include a memory storage device 241, and an on/off switch 242. Suitable memory storage devices 241 comprise a non-volatile flash memory, a non-volatile flash memory card, a hard disk and/or a volatile DRAM. The on/off switch 242 can be used to control power from the power source to any device and sensor needing power to operate. The on/off switch can control power from the power source to the acceleration sensor, the angular velocity sensor, the magnetic field sensor, the implement displacement sensor, the communication device and any other device and sensor. Suitable on/off switches comprise a mechanical switch, an electronic switch, a capacitive sensor, an accelerometer based trigger, a magnetic reed switch, an optical sensor, and an acoustic sensor.

Suitable temperature sensors 232 comprise a thermistor and a thermocouple. The temperature sensor can be used to measure the temperature of the handle and the head, such as a hair cutting implement, attached to the head.

The additional devices and sensors can be used with the previously identified devices and sensors to collect data on a wide variety of attributes taking place during the shaving event. In use, the user will grasp handle 202 of shaving razor 200. The power source 218 will power up and power the sensors needing power. The power source 218 may power up automatically upon contact with or movement by the user. Alternatively, the power source 218 may power up via on/off switch 242. Alternatively, the power source 218 may be constantly on and preferably in a power save mode while not in use and then in full power mode when in use. The user will then shave with shaving razor 200. As the user shaves data is collected from the at least one motion sensor 210, the hair cutting implement displacement sensor 214, and the orientation sensor 234. If included data may also be collected from clock 235, at least one temperature sensor 232, and barometric pressure sensor 230. The data collected may include pitch, roll, yaw, orientation, time data, temperature data, barometric pressure data, as well as contact data. When the user is finished shaving the shaving razor 200 is put down and data collection stops.

The collected data may be transmitted instantaneously as the data is collected via the communication device 216. Alternatively, the collected data may be stored in memory storage device 241. The collected data may be transmitted from memory storage device after the data from a single shaving event or multiple shaving events has been collected via the communication device 216.

Figure 6:
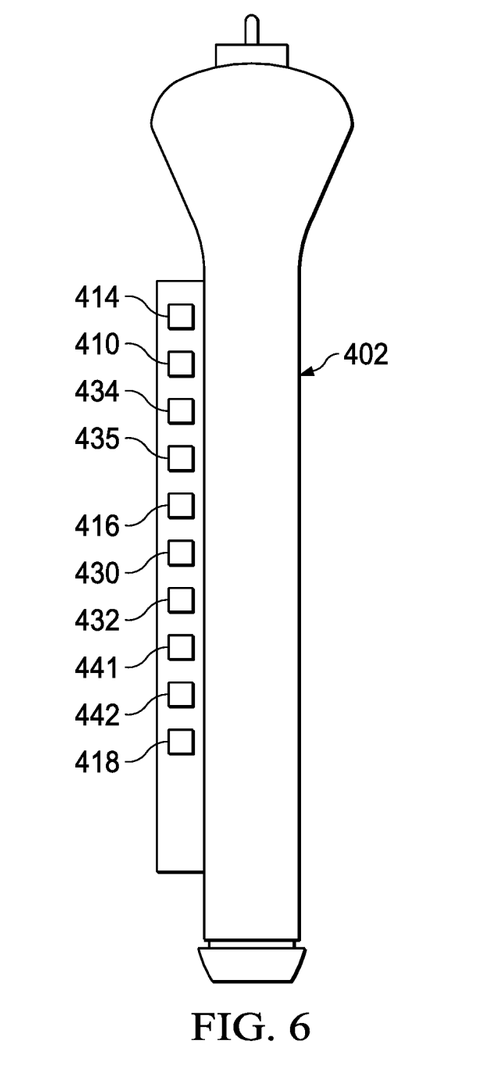
FIG. 6 is a partial cut away view of a handle for a shaving razor.

Referring to FIG. 6 there is shown another handle 402. The handle 402 can be used like handle 202 is used with shaving razor 200 shown in FIGS. 2 and 3. A hair cutting implement displacement sensor 414 is associated with handle 402. Hair cutting implement displacement sensor 414 is positioned on the handle. At least one motion sensor 410 is associated with handle 402. The at least one motion sensor 410 is positioned on the handle 402. A communication device 416 is associated with handle 402. Communication device is positioned on the handle 402. A power source 418 is associated with the handle 402. Power source 418 is positioned on the handle 402. A barometric pressure sensor 430 is associated with handle 402. Barometric pressure sensor 430 is positioned on the handle 402. A temperature sensor 432 is associated with the handle 402. The temperature sensor 432 is positioned on the handle 402. An orientation sensor 434 is associated with the handle 402. The orientation sensor 434 is positioned on the handle 402. A clock 435 is associated with the handle 402. Clock 435 is positioned on the handle 402. Memory storage 441 is associated with the handle 402. Memory storage 441 is positioned on the handle 402. An on/off switch 442 is associated with the handle 402. On/off switch 442 is positioned in the handle 402.

An example is below:

EXAMPLE

A. A method for generating user feedback information from a shave event associated with a user comprising the steps of:
   a. providing a shaving razor to a user, the shaving razor comprising;
      i. a handle comprising a connecting structure;
      ii. a hair cutting implement comprising at least one blade, the hair cutting implement being connected to the hair cutting implement connecting structure;
      iii. at least one motion sensor associated with the handle;
      iv. a hair cutting implement displacement sensor associated with the handle, the hair cutting implement displacement sensor measuring a displacement of the hair cutting implement relative to a fixed position of the handle;
      v. a communication device associated with the handle; and
      vi. a power source associated with the handle;
   b. powering the at least one motion sensor, the hair cutting implement displacement sensor and the communication device via the power source;
   c. collecting shave event data associated with the user during a shave from the at least one motion sensor and the hair cutting implement displacement sensor;
   d. processing the shave event data to generate user feedback information.
B. The method of paragraph A, wherein the user feedback information comprises at least one of the following, a quantity of shaving strokes taken, a type of shaving stroke taken, a direction a shaving stroke was taken, a length of a shaving stroke, a location on a user's body where a shave stroke is taken, a pressure/load exerted during a shave stroke, a speed of a shave stroke, a temperature of the water used during the shave, a time of day when the shave is taken, a total amount of time taken for the shave, a total contact time between the hair cutting implement and the user, a frequency that the user shaves, a sequence in which shaving strokes are taken, a shave stroke map, a count of upward strokes taken, a count of downward strokes taken, a count of the strokes taken with the hair grain, a count of the strokes taken against the hair grain, a count of the number of hair cutting implement rinses, an ejection of the hair cutting implement, a usage status of the hair cutting implement, and an attachment of a new hair cutting implement to the handle.
C. The method of either paragraph A or B, further comprising the step of e) communicating the user feedback information to the user.
D. The method of paragraph C, wherein the user feedback information is communicated to the user during the shave event or after the shave event.
E. The method of paragraph C, wherein the user feedback information is communicated to a computing device.
F. The method of paragraph E, wherein the computing device comprises a mobile device, a tablet, a handheld device and/or a desktop device such as a base station.
G. The method of any one of paragraphs A-F, further comprising the step of e) recommending a behavior to the user.
H. The method of paragraph G, wherein the recommendation is communicated to a computing device.
I. The method of paragraph H, wherein the computing device comprises a mobile device, a tablet, a handheld device and/or a desktop device such as a base station.
J. The method of paragraph G, wherein the recommended behavior comprises a maintenance of a user's behavior, a maintenance of a user's shave habit, a change in a user's shave habit, a change in the product to use prior to shaving, a change in the product to use after shaving, a change in the product to use during shaving, a change in the direction a shaving stroke is taken, a change in the length of a shaving stroke, a change in the number of shaving strokes taken, a change in the pressure/load applied during a shave stroke, a change in the speed of a shave stroke taken, a change in the location where the user shaves, a change in the amount of time taken to prepare the skin and hair for shaving, a change in the temperature of the water used during shaving, a change in the temperature of the water used to prepare the user's skin for shaving, a change in the time of day when the user shaves, a change in the frequency in which the user shaves, a change in the type of hair cutting implement being used during the shave, a change to a new hair cutting implement, a change in the product used on the skin between shaves, a change in the order of location on the body in which strokes are taken, and a change in the area of the user's body to be shaved.
K. The method of any one of paragraphs A-J, wherein the at least one motion sensor comprises an acceleration sensor, an angular velocity sensor, and/or a magnetic field sensor.
L. The method of any one of paragraphs A-K, wherein the hair cutting implement displacement sensor comprises a switch, a magnetometer, a Hall Effect sensor, a capacitive sensor, an optical sensor, a load sensor, and/or a displacement sensor.
M. The method of any one of paragraphs A-L, further comprising a barometric pressure sensor associated with the handle.
N. The method of any one of paragraphs A-M, further comprising at least one temperature sensor associated with the handle.

O. The method of paragraph N, wherein the at least one temperature sensor comprises a thermistor.

P. The method of any one of paragraphs A-O, wherein the power source comprises a rechargeable battery, a disposable battery or a corded electrical connection.

Q. The method of any one of paragraphs A-P, wherein the shaving razor comprises one or more sensors associated with the hair cutting implement.

R. The method of paragraph Q, wherein the one or more sensors associated with the hair cutting implement comprises a switch, an acceleration sensor, a magnetic field sensor, an angular velocity sensor, a velocity sensor, a distance sensor, a proximity sensor, a displacement sensor, a capacitive sensor, an electrical conductance sensor, an electrical resistance sensor, an electrical current sensor, a load sensor, a strain sensor, a friction sensor, a fluid flow sensor, a pressure sensor, an atmospheric pressure sensor, a temperature sensor, an optical sensor, an infrared sensor, an acoustic sensor, a vibration sensor, a humidity sensor, a chemical sensor, a particle detector, a bio sensor, an RFID sensor, a NFC sensor and/or a wireless receiver.

S. The method of any one of paragraphs A-R, further comprising a sensor for detecting the presence of the hair cutting implement on the handle.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for generating user feedback information from a shave event associated with a user comprising the steps of:
   a) providing a shaving razor to the user, the shaving razor comprising:
      i) a handle comprising a connecting structure;
      ii) a hair cutting implement comprising at least one blade, the hair cutting implement being connected to the connecting structure;
      iii) at least one motion sensor associated with the handle;
      iv) a hair cutting implement displacement sensor, the hair cutting implement displacement sensor comprising a magnet embedded in a follower which contacts the hair cutting implement and a magnetometer contained in the handle, as the hair cutting implement rotates it causes the follower to move inward into the handle displacing the magnet, the linear displacement of the follower directly correlates to the rotational displacement of the implement permitting the implement displacement sensor to measure a displacement of the hair cutting implement relative to a fixed position of the handle;
      v) a communication device associated with the handle; and
      vi) a power source associated with the handle;
   b) powering the at least one motion sensor, the hair cutting implement displacement sensor and the communication device via the power source;
   c) collecting shave event data associated with the user during the shave event from the at least one motion sensor and the hair cutting implement displacement sensor; and
   d) processing the shave event data to generate the user feedback information.

2. The method of claim 1, wherein the user feedback information comprises at least one of the following, a quantity of shaving strokes taken, a type of shaving stroke taken, a direction a shaving stroke was taken, a length of a shaving stroke, a location on a user's body where a shave stroke is taken, a pressure/load exerted during a shave stroke, a speed of a shave stroke, a temperature of the water used during the shave, a time of day when the shave is taken, a total amount of time taken for the shave, a total contact time between the hair cutting implement and the user, a frequency that the user shaves, a sequence in which shaving strokes are taken, a shave stroke map, a count of upward strokes taken, a count of downward strokes taken, a count of the strokes taken with the hair grain, a count of the strokes taken against the hair grain, a count of the number of hair cutting implement rinses, an ejection of the hair cutting implement, a usage status of the hair cutting implement, and an attachment of a new hair cutting implement to the handle.

3. The method of claim 1, further comprising the step of e) communicating the user feedback information to the user.

4. The method of claim 3, wherein the user feedback information is communicated to the user during the shave event or after the shave event.

5. The method of claim 3, wherein the user feedback information is communicated to a computing device.

6. The method of claim 5, wherein the computing device comprises a mobile device, a tablet, a handheld device or a desktop device.

7. The method of claim 1, further comprising the step of e) recommending a behavior to the user.

8. The method of claim 7, wherein the recommendation is communicated to a computing device.

9. The method of claim 8, wherein the computing device comprises a mobile device, a tablet, a handheld device or a desktop device.

10. The method of claim 9, wherein the recommended behavior comprises a maintenance of a user's behavior, a maintenance of a user's shave habit, a change in a user's shave habit, a change in the product to use prior to shaving, a change in the product to use after shaving, a change in the product to use during shaving, a change in the direction a shaving stroke is taken, a change in the length of a shaving stroke, a change in the number of shaving strokes taken, a change in the pressure/load applied during a shave stroke, a change in the speed of a shave stroke taken, a change in the location where the user shaves, a change in the amount of time taken to prepare the skin and hair for shaving, a change in the temperature of the water used during shaving, a change in the temperature of the water used to prepare the user's skin for shaving, a change in the time of day when the user shaves, a change in the frequency in which the user shaves, a change in the type of hair cutting implement being used during the shave, a change to a new hair cutting implement, a change in the product used on the skin between shaves, a change in the order of location on the body in which strokes are taken, and a change in the area of the user's body to be shaved.

11. The method of claim 1, wherein the at least one motion sensor comprises an acceleration sensor, an angular velocity sensor, or a magnetic field sensor.

12. The method of claim 1, wherein the hair cutting implement displacement sensor comprises a switch, a magnetometer, a Hall Effect sensor, a capacitive sensor, an optical sensor, a load sensor, or a displacement sensor.

13. The method of claim 1, further comprising a barometric pressure sensor associated with the handle.

14. The method of claim 1, further comprising at least one temperature sensor associated with the handle.

15. The method of claim 14, wherein the at least one temperature sensor comprises a thermistor.

16. The method of claim 1, wherein the power source comprises a rechargeable battery, a disposable battery or a corded electrical connection.

17. The method of claim 1, further comprising a sensor for detecting the presence of the hair cutting implement on the handle.

* * * * *